United States Patent
Eun (10) Patent No.: US 10,073,792 B2
(45) Date of Patent: Sep. 11, 2018

(54) DEVICE, SYSTEM, AND METHOD FOR DETECTING, IDENTIFYING, AND COMMUNICATING WITH A STORAGE MEDIUM

(71) Applicant: Jongsook Eun, Tokyo (JP)

(72) Inventor: Jongsook Eun, Tokyo (JP)

(73) Assignee: RICOH COMPANY LIMITED, Tokyo (JP)

( * ) Notice: Subject to any disclaimer, the term of this patent is extended or adjusted under 35 U.S.C. 154(b) by 243 days.

(21) Appl. No.: 14/916,327

(22) PCT Filed: Sep. 12, 2014

(86) PCT No.: PCT/JP2014/074762
§ 371 (c)(1),
(2) Date: Mar. 3, 2016

(87) PCT Pub. No.: WO2015/041306
PCT Pub. Date: Mar. 26, 2015

(65) Prior Publication Data
US 2016/0217084 A1 Jul. 28, 2016

(30) Foreign Application Priority Data
Sep. 17, 2013 (JP) .................................. 2013-192434

(51) Int. Cl.
*G06F 12/14* (2006.01)
*G06F 21/35* (2013.01)
(Continued)

(52) U.S. Cl.
CPC .......... *G06F 12/1458* (2013.01); *G06F 9/543* (2013.01); *G06F 21/35* (2013.01);
(Continued)

(58) Field of Classification Search
CPC ....... G06F 21/34; G06F 21/35; H04L 63/0853
See application file for complete search history.

(56) References Cited

U.S. PATENT DOCUMENTS

| 6,651,168 | B1 | 11/2003 | Kao et al. | |
|---|---|---|---|---|
| 8,055,824 | B2 * | 11/2011 | Irisawa | .................. G06F 3/0679 710/74 |

(Continued)

FOREIGN PATENT DOCUMENTS

| CN | 1700193 A | 11/2005 |
|---|---|---|
| CN | 101958838 A | 1/2011 |

(Continued)

OTHER PUBLICATIONS

Combine Russian Federation Office Action and Search Report dated Jun. 28, 2017 in Patent Application No. 2016109193/(014381) (with English translation).

(Continued)

*Primary Examiner* — Brian T Misiura
(74) *Attorney, Agent, or Firm* — Oblon, McClelland, Maier & Neustadt, L.L.P.

(57) ABSTRACT

A device includes: a storage medium control unit provided for each type of storage medium to at least read out information from the storage medium; a linkage unit that determines an application program corresponding to a type of a storage medium from which information is to be read out, through a first acquisition unit that acquires first correspondence information in which each application program is associated with a type of a storage medium from which the application program uses information, and determines a storage medium control unit corresponding to the type of the storage medium, through a second acquisition unit that acquires second correspondence information in which a storage medium control unit is associated with a type of a storage medium from which the storage medium control unit (Continued)

can read out information; and a management unit that enables the determined application program to use the determined storage medium control unit.

7 Claims, 9 Drawing Sheets

(51) Int. Cl.
  *G06F 9/54* (2006.01)
  *G06F 21/51* (2013.01)
  *H04L 29/06* (2006.01)

(52) U.S. Cl.
  CPC ...... *G06F 21/51* (2013.01); *G06F 2212/1052* (2013.01); *G06F 2221/032* (2013.01); *H04L 63/0823* (2013.01); *H04L 63/0853* (2013.01)

(56) References Cited

U.S. PATENT DOCUMENTS

| | | | | |
|---|---|---|---|---|
| 8,214,894 | B2* | 7/2012 | Ohtaka | H04L 9/3226 726/21 |
| 8,292,165 | B2* | 10/2012 | Adams | G06F 9/4411 235/380 |
| 8,789,016 | B2 | 7/2014 | Eastham et al. | |
| 9,633,188 | B2* | 4/2017 | Eun | G06F 21/34 |
| 2002/0044757 | A1 | 4/2002 | Kawamura et al. | |
| 2002/0126991 | A1 | 9/2002 | Kawamura et al. | |
| 2004/0015948 | A1 | 1/2004 | Sueyoshi et al. | |
| 2006/0171005 | A1 | 8/2006 | Eun | |
| 2007/0157171 | A1 | 7/2007 | Eastham et al. | |
| 2007/0220616 | A1 | 9/2007 | Oh | |
| 2008/0235434 | A1 | 9/2008 | Eun et al. | |
| 2008/0294562 | A1 | 11/2008 | Kasahara et al. | |
| 2009/0070868 | A1 | 3/2009 | Ohtaka et al. | |
| 2009/0234845 | A1 | 9/2009 | DeSantis et al. | |
| 2010/0149574 | A1 | 6/2010 | Eun et al. | |
| 2010/0205449 | A1 | 8/2010 | Eun et al. | |
| 2012/0011580 | A1 | 1/2012 | Eun et al. | |
| 2012/0210412 | A1 | 8/2012 | Ohtaka et al. | |
| 2013/0014240 | A1 | 1/2013 | Osuki | |
| 2013/0254859 | A1 | 9/2013 | Ohtaka et al. | |
| 2013/0321847 | A1 | 12/2013 | Eun | |
| 2014/0245414 | A1 | 8/2014 | Eun | |
| 2016/0275274 | A1* | 9/2016 | Eun | G06F 21/31 |

FOREIGN PATENT DOCUMENTS

| | | |
|---|---|---|
| CN | 102137209 A | 7/2011 |
| EP | 1 826 698 A2 | 8/2007 |
| JP | H08-328831 | 12/1996 |
| JP | 2000-215292 | 8/2000 |
| JP | 2000-347869 | 12/2000 |
| JP | 2002-244921 | 8/2002 |
| JP | 2007-206893 | 8/2007 |
| JP | 2008-097652 | 4/2008 |
| JP | 2009-129110 | 6/2009 |
| JP | 2010-097255 | 4/2010 |
| JP | 2010-225007 | 10/2010 |
| JP | 4649578 | 12/2010 |
| JP | 2011-242994 | 12/2011 |
| JP | 2011-257957 | 12/2011 |
| KR | 10-2013-0006356 A | 1/2013 |
| RU | 2 228 546 C2 | 5/2004 |
| RU | 2 395 836 C2 | 7/2010 |

OTHER PUBLICATIONS

Korean Notice of Allowance dated May 31, 2017 in Patent Application No. 10-2016-7006986 (with English language translation).
International Search Report dated Oct. 28, 2014 in PCT/JP2014/074762 filed Sep. 12, 2014.
Extended European Search Report dated Sep. 15, 2016 in Patent Application No. 14845847.4.
Chinese Office Action dated Jun. 14, 2018 in Chinese Patent Application No. 201480050716.0 with translation.

* cited by examiner

| IDENTIFIER OF AP | IDENTIFIER OF ID CARD CONTROL UNIT | IDENTIFIER OF ID CARD TYPE |
|---|---|---|
| FIRST AP | FIRST ID CARD CONTROL UNIT | DEFAULT DESIGNATION (NO DESIGNATION) |
| SECOND AP | DEFAULT DESIGNATION (NO DESIGNATION) | DEFAULT DESIGNATION (NO DESIGNATION) |
| THIRD AP | DEFAULT DESIGNATION (NO DESIGNATION) | THIRD ID CARD |

FIG.4

| IDENTIFIER OF ID CARD CONTROL UNIT | IDENTIFIER OF ID CARD TYPE | IN CASE OF DEFAULT DESIGNATION (NO DESIGNATION) |
|---|---|---|
| FIRST ID CARD CONTROL UNIT | FIRST ID CARD THIRD ID CARD | USED |
| SECOND ID CARD CONTROL UNIT | FOURTH ID CARD | USED |
| THIRD ID CARD CONTROL UNIT | SECOND ID CARD | |

```
CARD ID OF FIRST CARD
01010310DA09D027
```

DEVICE, SYSTEM, AND METHOD FOR DETECTING, IDENTIFYING, AND COMMUNICATING WITH A STORAGE MEDIUM

TECHNICAL FIELD

The present invention relates to a device, a system, and a method.

BACKGROUND ART

A plurality of application programs can be installed in the device. The application programs include an application program formed by a manufacturer of the device and an application program formed by a third vendor (a third party). In addition, as an ID card, a number of types of ID cards are widely used, and an information form of information and an information acquisition method are different for each ID card. Thus, it is difficult to allow various application programs to use information stored in various types of ID cards.

Therefore, it has been difficult to allow the security control method for a card type storage medium and conventional devices using information of ID cards to support various types of ID cards and use information stored in the ID cards.

The invention is made in view of the above aspects and aims at providing a device, a system, and a method that support various types of ID cards and makes it possible to use information stored in the ID cards.

SUMMARY OF THE INVENTION

A device includes: a storage medium control unit provided for each type of storage medium to at least read out information stored in the storage medium; a first acquisition unit that acquires first correspondence information in which each application program is associated with a type of a storage medium from which the application program uses information; a second acquisition unit that acquires second correspondence information in which a storage medium control unit is associated with a type of a storage medium from which the storage medium control unit can read out information; a linkage unit that determines an application program corresponding to a type of a storage medium from which information is to be read out, through the first acquisition unit, and determines a storage medium control unit corresponding to the type of the storage medium from which information is to be read out, through the second acquisition unit; and a management unit that enables the determined application program to use the determined storage medium control unit.

DESCRIPTION OF EMBODIMENTS

The following will describe, in detail, embodiments of a device, a system, and a method with reference to the attached drawings.

Overview

A device of an embodiment preliminarily stores therein, for each ID card type, a plurality of ID card control units that support information forms and information acquisition methods different depending on the ID card type and enable access to information stored in an ID card. The ID card is an example of a storage medium. Moreover, the correspondence relation among an application program, an ID card control unit, and an ID card type is registered in a table. When the ID card is attached, the table is referred to in accordance with the ID card type, and the application program and the ID card control unit corresponding to the ID card type are determined. Thereafter, the determined application program is allowed to access the ID card through the determined ID card control unit. Thus, it is made possible to support various types of ID cards and use information stored in the ID cards.

Configuration of First Embodiment

Figure 1:
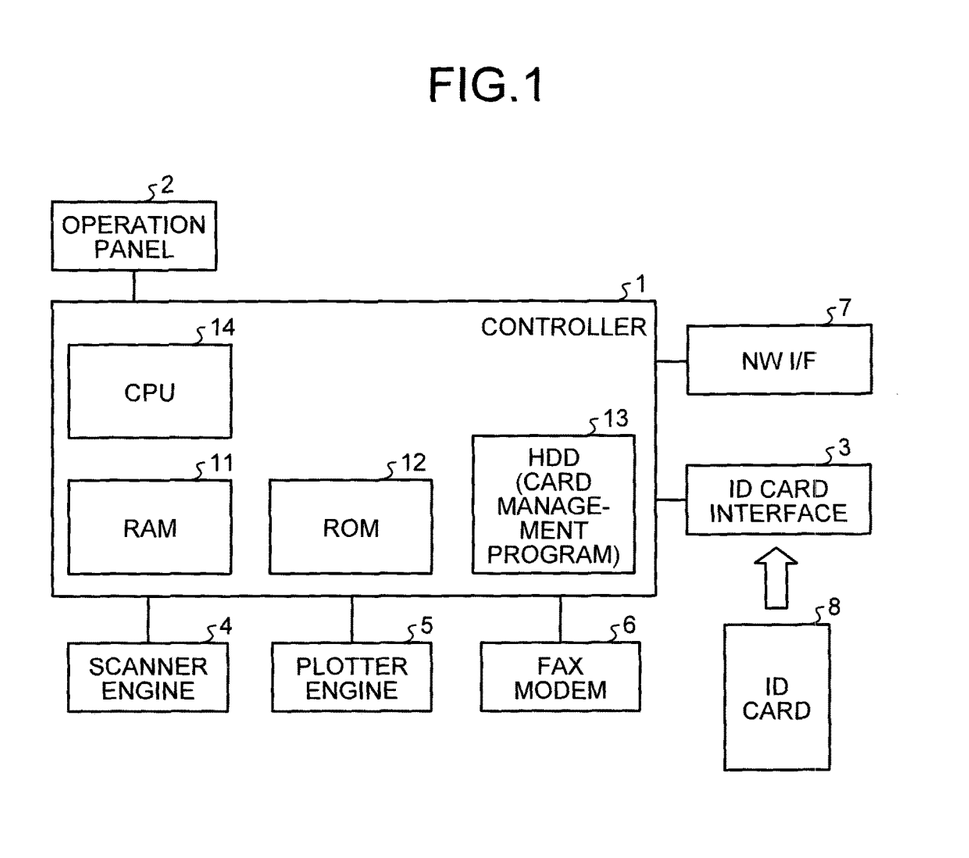
FIG. 1 is a hardware configuration diagram of a device according to a first embodiment.

FIG. 1 is a hardware configuration diagram of a device according to a first embodiment. The device illustrated in FIG. 1 is an image forming apparatus, although it is only an example. Note that the device illustrated in FIG. 1 may be a device other than an image forming apparatus. In FIG. 1, the device includes a controller 1, an operation panel 2, an ID card interface 3, a scanner engine 4, a plotter engine 5, a modem device for a facsimile (FAX modem) 6, a network interface (NWI/F) 7. The ID is an abbreviation of "Identification".

The operation panel 2 is a display panel having a touch detection function, in which a touch panel formed by a transparent electrode, for example, is provided on a liquid crystal display panel. The operation panel 2 is connected to the controller 1 through a Peripheral Component Interconnect (PCI) bus line, for example. A user performs contact operation on a button displayed on the liquid crystal display panel, for example. A CPU 14 detects a command corresponding to a button displayed on a contact operation position, for example. The CPU 14 performs processing corresponding to the detected command.

An ID card 8 is attached on the ID card interface 3. Although described later, in the case of the device of the embodiment, the information stored in various types of ID cards 8 is available. Note that the ID card 8 is an example of a storage medium. Thus, another medium may be used, other than what is referred to as the ID card. FIG. 1 illustrates that the ID card interface 3 performs wired communication with the controller 1. However, the ID card interface 3 may be configured to perform wireless communication with the controller 1.

The controller 1 includes a RAM 11, a ROM 12, a hard disk drive (HDD) 13, and the CPU 14. The RAM is an abbreviation of "Random Access Memory". The ROM is an abbreviation of "Read Only Memory". The CPU is an abbreviation of "Central Processing Unit". The HDD 13 is an example of a storage unit.

The RAM 11 is what is called a work area and used for development processing of image data of an image to be printed, for example. The RAM 11 is also used for loading processing of various application programs, for example. The RAM 11 is also used as a temporary storage area of data processed by each application program, for example. The ROM 12 stores therein a program of what is called an operating system (OS) and various kinds of data, which are executed when the device of the embodiment is activated.

Figure 2:
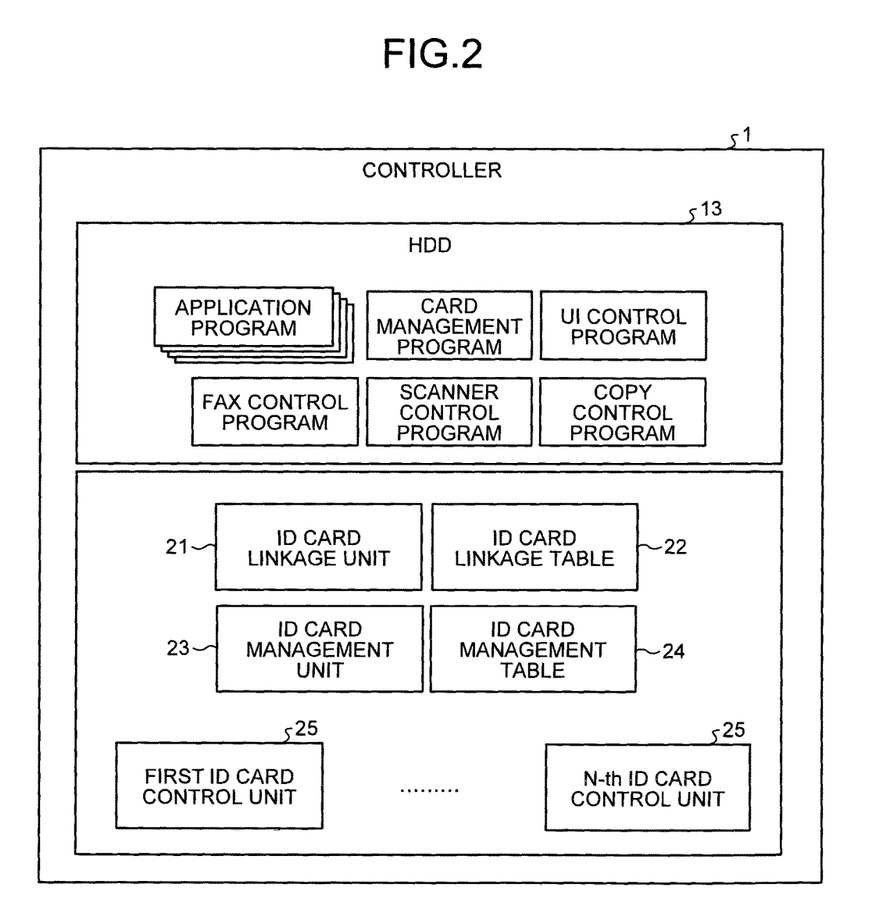
FIG. 2 is a functional block diagram of a controller provided in the device according to the first embodiment.

The HDD 13 stores therein various application programs, a card management program, a UI control program, a FAX control program, a scanner control program, and a copy control program, for example, as illustrated in FIG. 2. The UI is an abbreviation of "User Interface". Such programs are installed, into the device, from a disk-form storage medium or a semiconductor storage medium, for example, or downloaded through a network and installed into the device.

The various application programs stored in the HDD 13 include programs developed by the manufacturer of the device of the embodiment and programs developed by a third vendor (a third party).

The card management program is read and executed by the CPU 14, which enables the use of various kinds of information stored in the ID card 8 in accordance with the type of the ID card 8 used by an operator. The UI control program is read and executed by the CPU 14, which enables display control of the operation panel 2 and information processing in accordance with touch operation.

The CPU 14 operates in accordance with an OS stored in the ROM 12. The CPU 14 also loads the card management program, the various application programs, and the various control programs stored in the HDD 13, for example, into the RAM 11 and executes them.

The ID card interface 3 includes an attachment portion of the ID card 8 and a reader and writer unit that reads and writes information from and to the ID card 8 attached on the attachment portion. The information stored in the ID card 8 is read out by an ID card control unit 25 corresponding to the type of the ID card 8 attached on the ID card interface 3, and used by the application program.

The scanner engine 4 optically reads out a document placed on a document reading table and generates image data. The plotter engine 5 prints an image by transferring a toner image formed on a photosensitive drum onto a recording sheet by an electrophotographic process method, for example. The FAX modem 6 receives a facsimile image transmitted through a telephone line and transmits a facsimile image thorough the telephone line.

The NWI/F 7 is an interface for connection between, for example, a server apparatus or a host computer apparatus on a certain network and the device of the embodiment. The device of the embodiment can acquire image data of an image to be printed, for example, from a host computer apparatus or the like connected through the NWI/F 7.

Next, the device of the embodiment includes an ID card linkage unit 21, an ID card linkage table 22, an ID card management unit 23, an ID card management table 24, and first to n-th ID card control units 25 (n is a natural number equal to or larger than 2). The functions of such ID card linkage unit 21 to ID card control units 25 may be implemented with software by the CPU 14 reading and executing the card management program stored in the HDD 13, or one part or the entire part thereof may be implemented with hardware. The ID card linkage unit 21 is an example of a linkage unit. The ID card linkage table 22 is an example of a first acquisition unit. The ID card management unit 23 is an example of a management unit. The ID card management table 24 is an example of a second acquisition unit.

Each ID card control unit 25 is an example of a storage medium control unit. Each ID card control unit 25 corresponds to each type of ID card 8, and acquires information stored in the ID card 8, so that the information is available for the application program, as described above. That is, each ID card control unit 25 is an information processing unit dedicated to each type of ID card 8. Note that one ID card control unit 25 may correspond to one type of ID card or may correspond to a plurality of types of ID cards.

Figure 3:
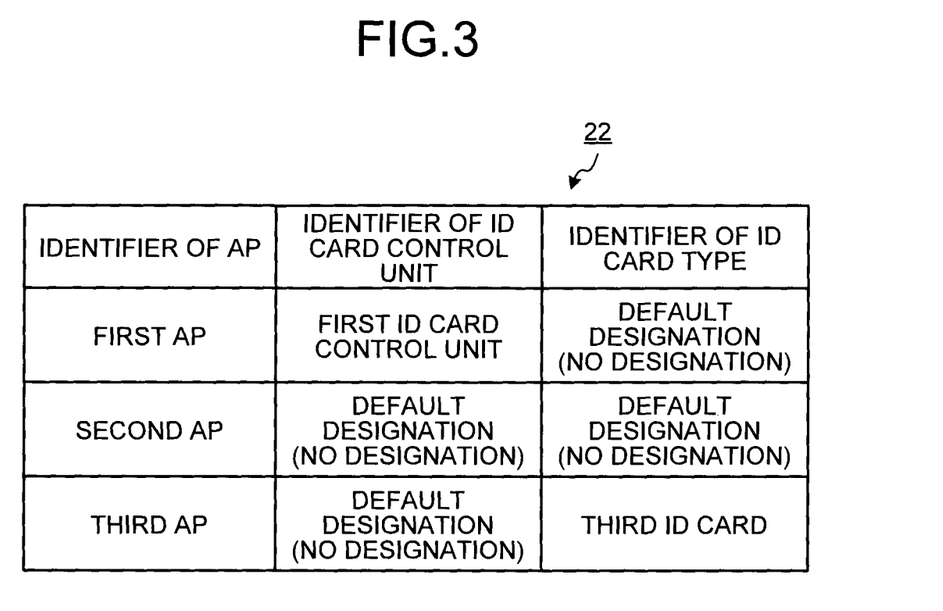
FIG. 3 is a schematic view of an ID card linkage table provided in the device according to the first embodiment.

FIG. 3 illustrates a schematic view of the ID card linkage table 22. In the ID card linkage table 22, identifiers of various application programs (AP) stored in the HDD 13, identifiers of ID card control units 25, and identifiers of various types of ID cards 8 are registered so that they are associated to one another. The methods of using the ID card 8 by the application program include a "first usage method in which an identifier of the ID card control unit 25 is designated for use" and a "second usage method in which an identifier of an ID card type is designated for use". In addition, there is a "third usage method in which nothing is designated for use (no designation)". Note that "no designation" is set as a default.

The example of a first application program (first AP) illustrated in FIG. 3 is an example in which the first ID card control unit 25 is designated as an ID card control unit and no ID card type is designated. Similarly, the example of a second application program (second AP) is an example in which no ID card control unit 25 or ID card type is designated. Similarly, a third application program is an example in which no ID card control unit is designated and the third ID card is designated as the ID card type.

Here, in the case of a browser AP for a multifunction peripheral, for example, that provides cloud service and/or the like based on a card identifier (example: 0114318be9091304) read out from a user's ID card, it is often made into a product without depending on a certain type of user's ID card. For such an AP, it is preferable that the ID card can be read out without explicitly designating (knowing) a type of ID card supported in an environment of a multifunction peripheral of a user.

FIG. 3 illustrates the aforementioned situation. Although, usually, a service engineer or an authorized person such as a manager explicitly designates a nine-digit product ID (example: 285412688) as an identifier of an ID card control unit, he or she may alternatively designate an "identifier of ID card type". Note that as the "identifier of ID card type", a preliminarily-defined character string such as "FeliCa (registered trademark)" or "Mifare (registered trademark)" may be used. The "default designation of identifier of ID card type (no designation)" illustrated in FIG. 3 indicates that an ID card can be read out without explicitly designating (knowing) the above-described character string such as "FeliCa (registered trademark)".

Figure 4:
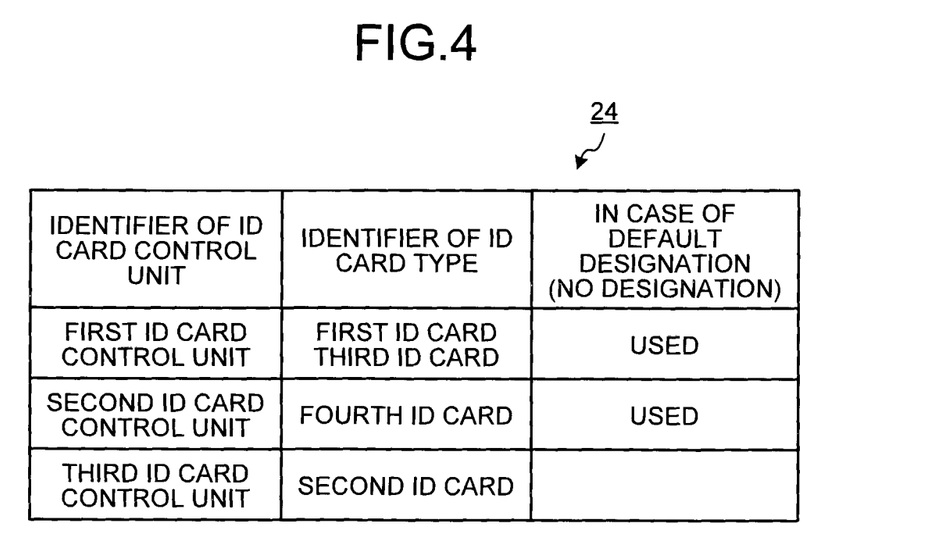
FIG. 4 is a schematic view of an ID card management table provided in the device according to the first embodiment.

FIG. 4 illustrates a schematic view of the ID card management table 24. The ID card management table 24 is a table for managing ID card control units 25 and ID card types that are effective in the device. In the ID card management table 24, an identifier of the ID card control unit 25, an identifier of the ID card type, and information indicating whether the above default designation is used (no designation) are stored in an associated manner.

The example illustrated in FIG. 4 indicates an example in which the first ID card control unit 25 corresponds to the first ID card 8 and the third ID card 8 and the above-described default designation (no designation) is set to "used". Similarly, the example illustrated in FIG. 4 indicates an example in which the second ID card control unit 25 corresponds to the fourth ID card 8 and the above-described default designation (no designation) is set to "used". Similarly, the example illustrated in FIG. 4 indicates an example in which the third ID card control unit 25 corresponds to the second ID card 8.

A legitimately authorized person such as a manager can set and change the default designation described above. Moreover, in the case of no designation by the application program, the operation is performed following "default designation". Note that it is also possible to make "default designation" to an initially-installed ID card control unit. In addition, "used" in the case of default designation (no designation) indicates that in the case of an AP (example: the above-described browser AP) not explicitly designating an identifier of the ID card control unit 25 or an identifier of the ID card type, for example, the "fourth ID card" supported by the second card control unit 25 is also available as well as the "first ID card" and the "third ID card" supported by the first ID card control unit 25.

Operation of First Embodiment

Figure 5:
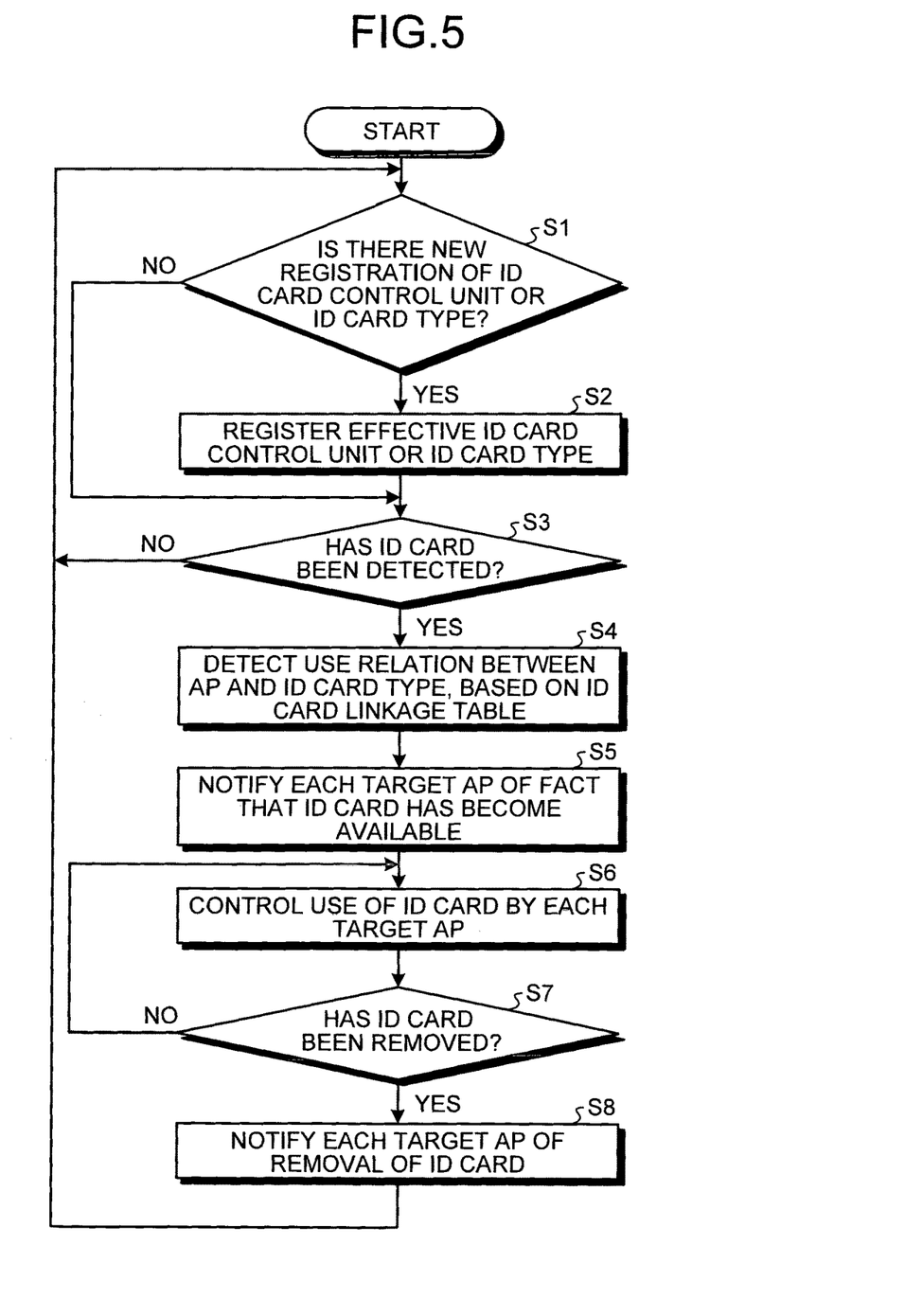
FIG. 5 is a basic flowchart when an ID card is used by a plurality of application programs provided in the device according to the first embodiment.

FIG. 5 is a basic flowchart when the ID card 8 is used by a plurality of application programs in the device according to the first embodiment. First, the CPU 14 constantly monitors an operation state of the operation panel 2. The CPU 14 determines, at Step S1, whether new registration of an ID card control unit 25 or an ID card type is designated, based on a monitored operation state of the operation panel 2. If the new registration of an ID card control unit 25 or an ID card type is designated (Yes at Step S1), the processing shifts to Step S2. If the new registration of an ID card control unit 25 or an ID card type is not designated (No at Step S1), the processing shifts to Step S3.

When the new registration of an ID card control unit 25 or an ID card type is designated and the processing shifts to Step S2, the CPU 14 determines whether the ID card control unit 25 or the ID card type designated to be registered is effective. The CPU 14 then registers the ID card control unit 25 or the ID card type that has been determined to be effective. When the ID card control unit 25 is software, the new ID card control unit 25 is registered in a memory in which the ID card control units 25 are registered. When the ID card control unit 25 is hardware, the new ID card control unit 25 is electrically connected to the device. In this case, the CPU 14 performs recognition processing of the newly-connected ID card control unit 25, and enables the use of the newly-connected ID card control unit 25 in the device.

Moreover, when the registration of a new ID card type is designated, the ID card management unit 23 registers the new ID card type in the ID card linkage table 22 illustrated in FIG. 3 so that the new ID card type is associated with the corresponding application program and the corresponding ID card control unit 25. Moreover, when the registration of a new ID card type is designated, the ID card management unit 23 registers the new ID card type in the ID card management table 24 illustrated in FIG. 4 so that the new ID card type is associated with the corresponding ID card control unit 25.

The new ID card control unit 25 or the new ID card type is registered in this manner, whereby a plurality of ID card control units 25 enabling the use of information stored in ID cards are registered in the device so as to correspond to various types of ID cards, as illustrated in FIG. 2. Moreover, each of the registered ID card control units 25 is associated with the corresponding application program and the corresponding ID card type and registered in the ID card linkage table 22 and the ID card management table 24 illustrated in FIG. 3 and FIG. 4.

Next, the CPU 14 also monitors whether the ID card 8 has been attached on the ID card interface 3. If the CPU 14 has detected at Step S3 that the effective ID card 8 is attached on the device of the embodiment (Yes at Step S3), the processing shifts to Step S4. Moreover, if the CPU 14 has not detected the attached ID card 8 on the ID card interface 3 at Step S3 (No at Step S3), the processing returns to Step S1.

Subsequently, when the processing shifts to Step S4, the ID card linkage unit 21 refers to the ID card linkage table 22 and determines an application program (a target AP) and the ID card control unit 25 that correspond to the type of the attached ID card 8. Thereafter, the processing shifts to Step S5. At Step S5, the ID card linkage unit 21 transmits a notification indicating that the attached ID card 8 has become available to each target AP. Receiving the notification, each target AP becomes able to use information stored in the ID card 8.

The ID card management unit 23 and the ID card control unit 25 corresponding to the attached ID card 8 acquire information requested from a target AP from the ID card 8 and transmits the information to the target AP (the CPU 14 driven by the target AP). In this manner, the information stored in the ID card 8 becomes available by the target AP.

Figure 6:
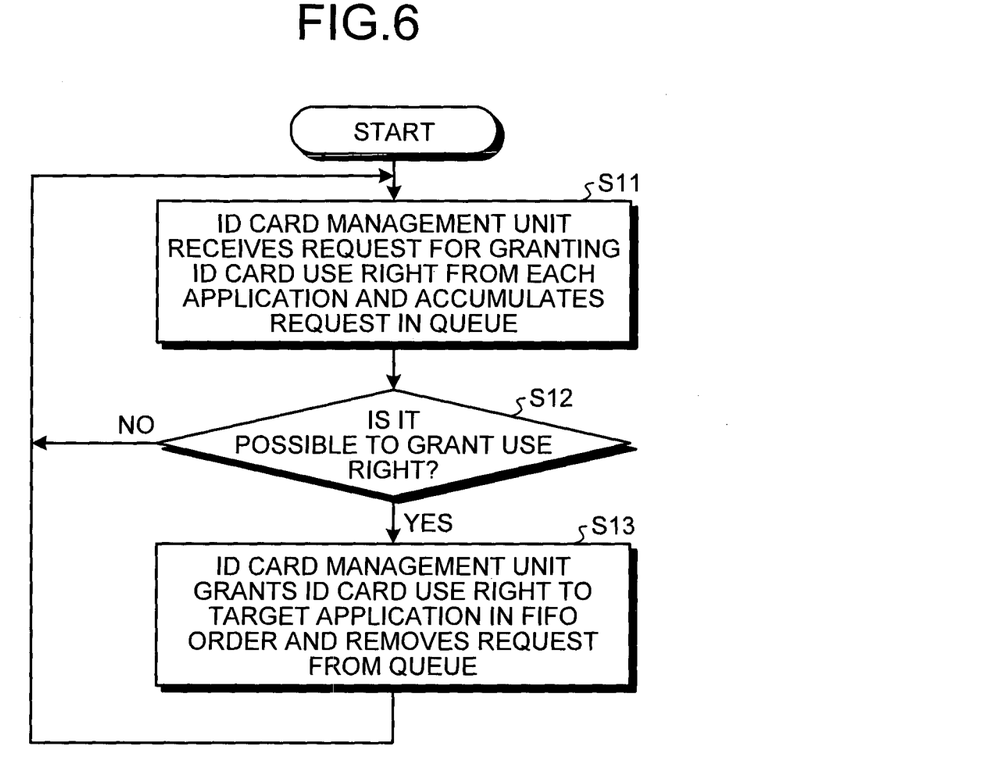
FIG. 6 is a flowchart illustrating a flow of use control of information stored in the ID card, by an ID card management unit provided in the device according to the first embodiment.

FIG. 6 is a flowchart illustrating a flow of use control of information stored in the ID card 8 by the ID card management unit 23. In the case of the device of the embodiment, the ID card management unit 23 issues one use right of ID card for one ID card. The one use right of ID card is used among target APs. At Step S11 of the flowchart in FIG. 6, the ID card management unit 23 receives grant requests for a use right of the ID card 8 transmitted from application programs and adds them to a queue of a FIFO memory. The FIFO is an abbreviation of "First In First Out".

At Step S12, the ID card management unit 23 determines whether a grant request at the head of the queue can be granted the use right. That is, the ID card management unit 23 determines whether the grant request at the head of the queue is a grant request from the target AP corresponding to the type of the ID card 8 attached currently. If the ID card management unit 23 has determined that the grant request at the head of the queue is a grant request from the target AP (Yes at Step S12), the processing shifts to Step S13. If the ID card management unit 23 has determined that the grant request of a head of a queue is not a grant request from the target AP (No at Step S12), it removes the grant request from the queue, and the processing returns to Step S11.

At Step S13, the ID card management unit 23 grants the use right of the ID card 8 to the target AP having transmitted the grant request at the head of the queue, and removes the grant request from the queue. Thereafter, the processing returns to Step S11. The target AP to which the use right of the ID card 8 is granted transmits, when using information stored in the ID card 8, the granted use right of ID card to the ID card management unit 23, and then makes a request for acquiring desired information of the ID card 8. Moreover, the access to the ID card 8 using the use right of ID card is effective only once. Thus, each target AP reacquires the use right of ID card when accessing the ID card 8 again.

Figure 7:
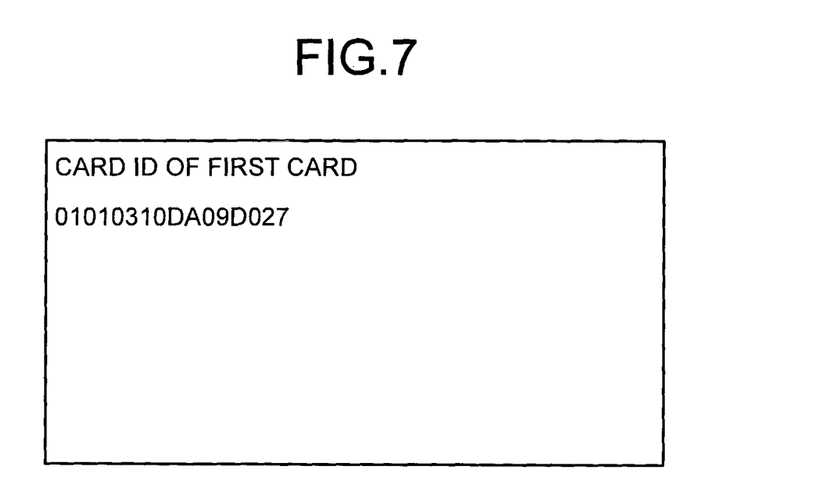
FIG. 7 is a diagram illustrating an example of a card ID stored in the ID card.

The information acquired by each target AP from the ID card 8 includes unique identification information, for example. As the unique identification information, a product number (a serial number) illustrated in FIG. 7, for example, is provided as an identifier (a card ID). To be more specific, as the card ID, a card ID referred to as "FeliCa (registered trademark) IDm" is provided in the case of a FeliCa (registered trademark) card. Similarly, a card ID referred tows "UID (Unique ID)" is provided in the case of a Mifare (registered trademark) card. Similarly, a card ID referred to as ".comID (dot com ID)" is provided in the case of an eLWISE (trademark) card.

The information form of a card ID and the method of acquiring information thereof are different depending on a type of the ID card 8. Therefore, the ID card management unit 23 acquires the above-described card ID and/or the like from the currently-attached ID card 8 by selectively using the ID card control unit 25 corresponding to the type of the currently-attached ID card 8.

While the use of the ID card 8 by each application program is controlled in this manner, the CPU 14 monitors whether the ID card 8 attached on the ID card interface 3 has been removed, at Step S7. Until the CPU 14 detects the removal of the ID card 8 (No at Step S7), the processing returns to Step S6, and the ID card management unit 23 controls the use of the ID card 8 by each target AP.

By contrast, if the CPU 14 has detected the removal of the ID card 8 (Yes at Step S7), the ID card management unit 23 notifies each target AP of the removal of the ID card 8, at Step S8. The notification allows each target AP to recognize that the information of the ID card 8 has become unavailable.

Figure 8:
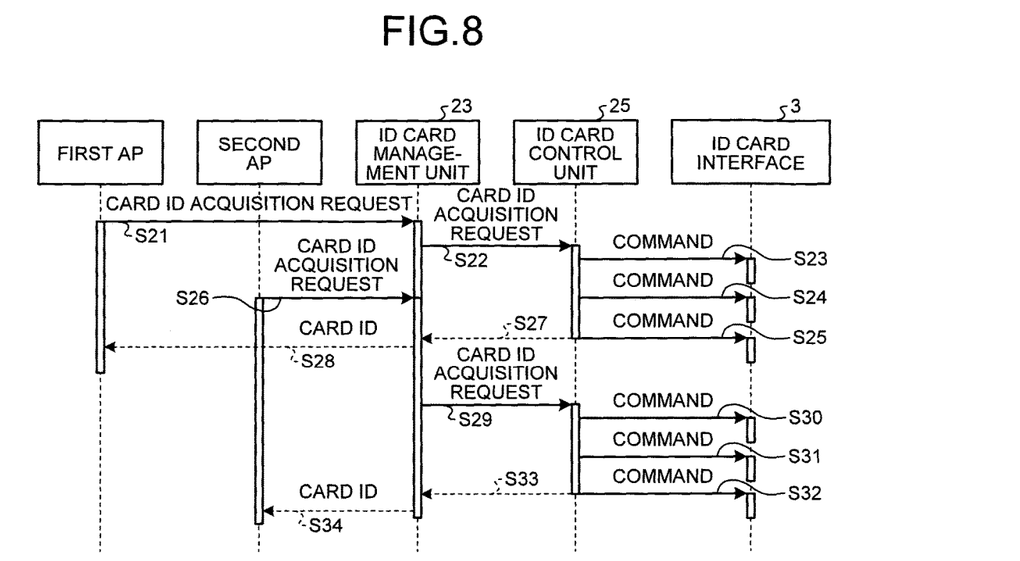
FIG. 8 is a basic time chart when the ID card is used by the application programs provided in the device according to the first embodiment.

Next, FIG. 8 illustrates a time chart when the same ID card 8 is used by the application programs at the same time. In such a case, while one application program uses the use right of the ID card 8, a request for acquiring information of the ID card 8, for example, of another application program is limited. Note that the following will describe a case in which the first application program (first AP) and the second application program (second AP) acquire the card ID from the ID card 8 at the same time.

First, if the first AP has acquired the use right of the ID card 8 earlier at Step S21 of the time chart in FIG. 8, the first AP transmits the use right to the ID card management unit 23 and makes a request for acquiring the card ID. The ID card management unit 23 refers to the ID card management table 24 and thus determines the ID card control unit 25 corresponding to the ID card 8 attached currently. At Step S22, the ID card management unit 23 transmits a request for acquiring a card ID to the determined ID card control unit 25.

The ID card control unit 25 having received the request for acquiring a card ID transmits commands for acquiring a card ID to the ID card interface 3 on which the ID card 8 is attached, as illustrated at Step S23 to Step S25. Such commands are commands for reading out information of the ID card 8. In response to the commands, the ID card interface 3 reads out a card ID from the ID card 8 and transmits the card ID to the ID card management unit 23, as illustrated at Step S27.

The ID card management unit 23 transmits the card ID transmitted from the ID card interface 3 to the first AP (CPU 14 operated by the first AP), as illustrated at Step S28. In this manner, the first AP can authorize a user or permit the use of a predetermined function, for example, using the acquired card ID.

Next, when the first AP makes a request for acquiring a card ID to the ID card management unit 23, the use of the use right of the ID card 8 by the first AP is finished, and the other application program becomes able to acquire the use right of the ID card 8. It is supposed that the second AP has acquired the use right of the ID card 8 while the card ID is being acquired from the ID card 8 in response to a request for acquiring a card ID by the first AP. In this case, the second AP transmits the use right to the ID card management unit 23 and makes a request for acquiring a card ID at Step S26. In the case of this example, the request for acquiring a card ID by the second AP is transmitted from the ID card management unit 23 to the ID card control unit 25 at Step S29 after the first AP has acquired information from the ID card 8.

The ID card control unit 25 having received the request for acquiring a card ID transmits commands for acquiring a card ID to the ID card interface 3 on which the ID card 8 is attached, as illustrated at Step S30 to Step S32. In response to the commands, the ID card interface 3 reads out a card ID from the ID card 8 and transmits the card ID to the ID card management unit 23, as illustrated at Step S33.

The ID card management unit 23 transmits the card ID transmitted from the ID card interface 3 to the second AP (the CPU 14 operated by the second AP), as illustrated at Step S34. In this manner, the second AP can authorize a user or permit the use of a predetermined function, for example, using the acquired card ID.

Next, in the case of the device of the embodiment, after the application program having the use right of the ID card 8 transmits a desired request to the ID card management unit 23, the use of the use right of the ID card 8 is finished. At this point of time, the other application program becomes able to acquire the use right of the ID card 8. Thus, the application program using the use right of the ID card 8 later may acquire information in response to a request, from the ID card 8 earlier. The time chart illustrated in FIG. 9 illustrates such a case.

Figure 9:
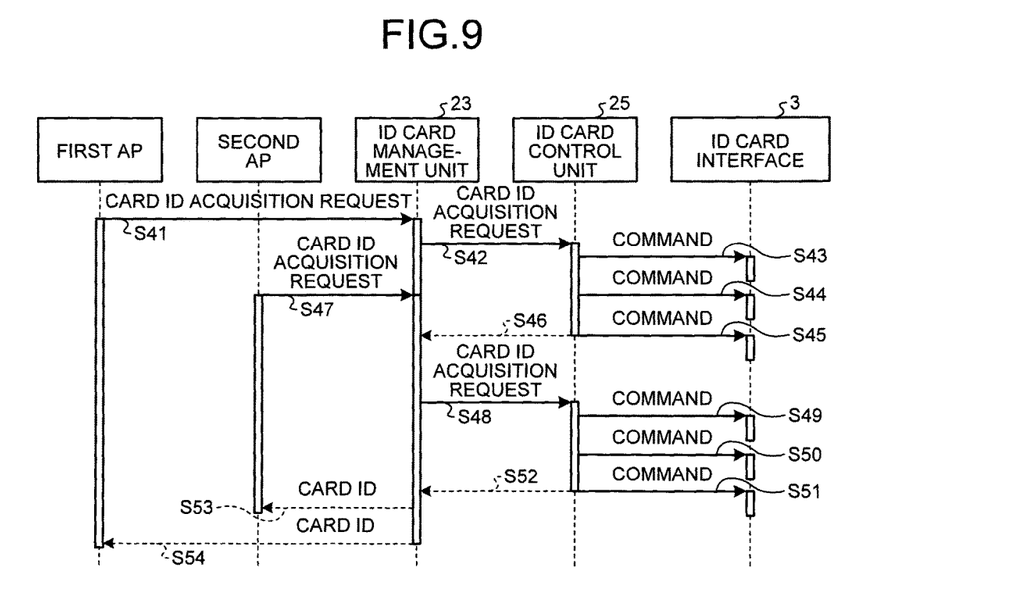
FIG. 9 is a time chart illustrating an example in which when the ID card is used by the application programs provided in the device according to the first embodiment, the card ID is transmitted earlier in response to a later card ID acquisition request.

That is, in the case of the example illustrated in FIG. 9, the first AP acquires the use right of the ID card 8 earlier and makes a request for acquiring a card ID at Step S41, and after this request, the second AP acquires the use right of the ID card 8 and makes a request for acquiring a card ID at Step S47. In this case, the ID card management unit 23 and the ID card control unit 25 acquire a card ID corresponding to the card ID acquisition request by the first AP (Step S41) from the ID card interface 3 at Step S42 to Step S46. Moreover, the ID card management unit 23 and the ID card control unit 25 acquire a card ID corresponding to the card ID acquisition request by the second AP (Step S47) from the ID card interface 3 at Step S48 to Step S52.

In this example, the ID card management unit 23 transmits, at Step S53, the card ID corresponding to the card ID acquisition request by the second AP, which has been acquired later, to the CPU 14 operated by the second AP. Moreover, after transmitting the card ID to the CPU 14 operated by the second AP, the ID card management unit 23 transmits, at Step S54, the card ID corresponding to the card ID acquisition request by the first AP, to the CPU 14 operated by the first AP. In this manner, the application program using the use right of the ID card 8 later (the second AP, in this example) may acquire information in response to a request, from the ID card 8 earlier.

Figure 10:
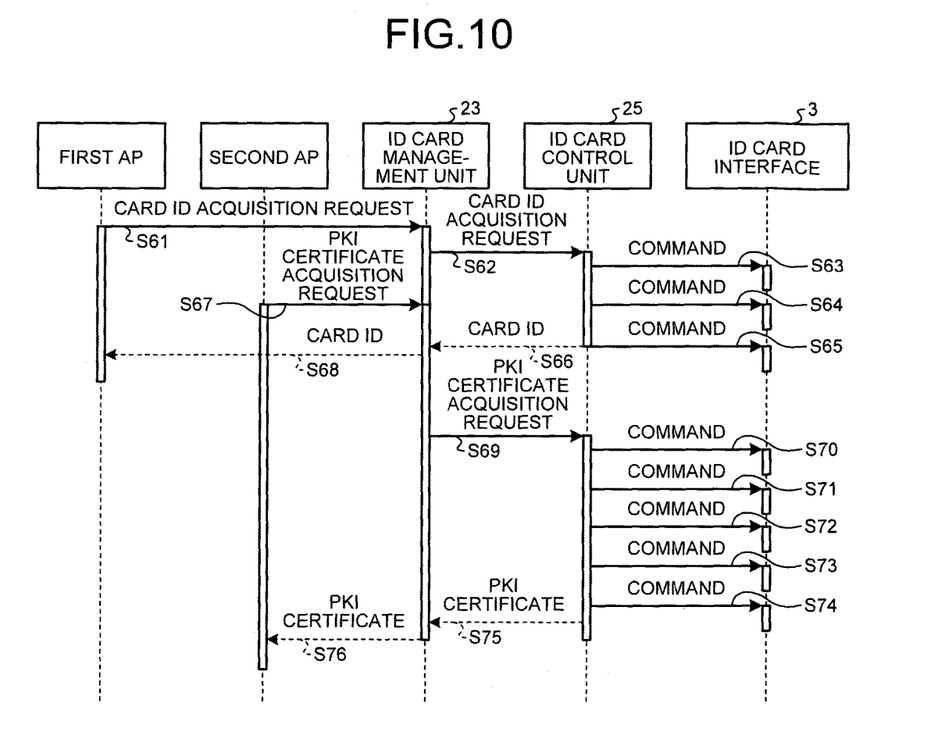
FIG. 10 is a time chart when the ID card and a PKI certificate are used in the application programs provided in the device according to the first embodiment.

Moreover, each of the examples described above is an example in which a card ID is acquired from the ID card 8. However, not only the card ID but also other kinds of information may be acquired from the ID card 8. FIG. 10 illustrates an example in which the first AP acquires a card ID from the ID card 8 and the second AP acquires a PKI certificate from the ID card 8. The PKI is an abbreviation of "Public Key Infrastructure".

Figure 11:
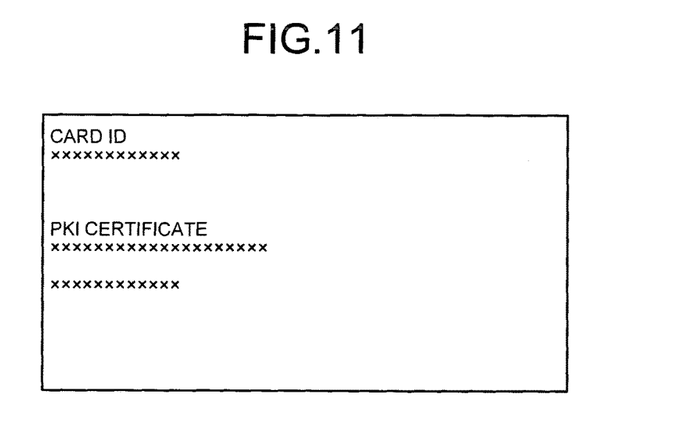
FIG. 11 is a diagram illustrating the card ID and the PKI certificate stored in the ID card.

In FIG. 10, the first AP makes a card ID acquisition request to the ID card management unit 23 at Step S61. Moreover, the second AP makes a PKI certificate acquisition request at Step S67. The ID card management unit 23 and the ID card control unit 25 acquire, at Step S62 to Step S66, a card ID stored in the ID card 8 as illustrated in FIG. 11. The acquired card ID is then transmitted to the CPU 14 operated by the first AP at Step S68.

Moreover, the ID card management unit 23 and the ID card control unit 25 acquire, at Step S69 to Step S75, a PKI certificate stored in the ID card 8 as illustrated in FIG. 11. The acquired PKI certificate is then transmitted to the CPU 14 operated by the second AP at Step S76. In this manner, each application program can acquire various kinds of information from the ID card 8 and use them.

As is clear from the above description, the device of the first embodiment is provided with the ID card control units 25 corresponding to respective types of ID card 8 and respective application programs (AP), which enable the use of information stored in the ID card 8 that is an example of a storage medium. Moreover, the device of the first embodiment is provided with the ID card linkage table 22 associating the APs, the ID card control units 25 corresponding to the APs, and the types of the ID cards 8 from which the APs use information. Furthermore, the device of the first embodiment is provided with the ID card management table 24 associating the ID card control units 25 and the ID cards. 8 supported by the ID card control units 25.

The device of the first embodiment determines an AP corresponding to the type of the ID card 8 attached on the ID card interface 3, from the ID card linkage table 22, and notifies the AP of the fact that the corresponding ID card 8 is attached. When the AP having received the notification uses information stored in the ID card 8, the ID card control unit 25 corresponding to the type of the ID card 8 mediates communication and information processing between the AP and the ID card 8. This enables the use of information stored in the ID card 8 in accordance with the type of the attached ID card 8.

Second Embodiment

Next, a system according to a second embodiment will be described. The case of the first embodiment described above is an example in which the card management program and the ID card linkage unit 21 to the ID card control units 25 are provided in the device. By contrast, the information processing system of the second embodiment is an example in which the card management program and the ID card linkage unit 21 to the ID card control units 25 are provided in a server apparatus connected to the device through a network. Note that the first embodiment described above is different from the second embodiment described in the following only in this aspect. Therefore, in the following, only the difference is described, and the overlapped description is omitted.

Figure 12:
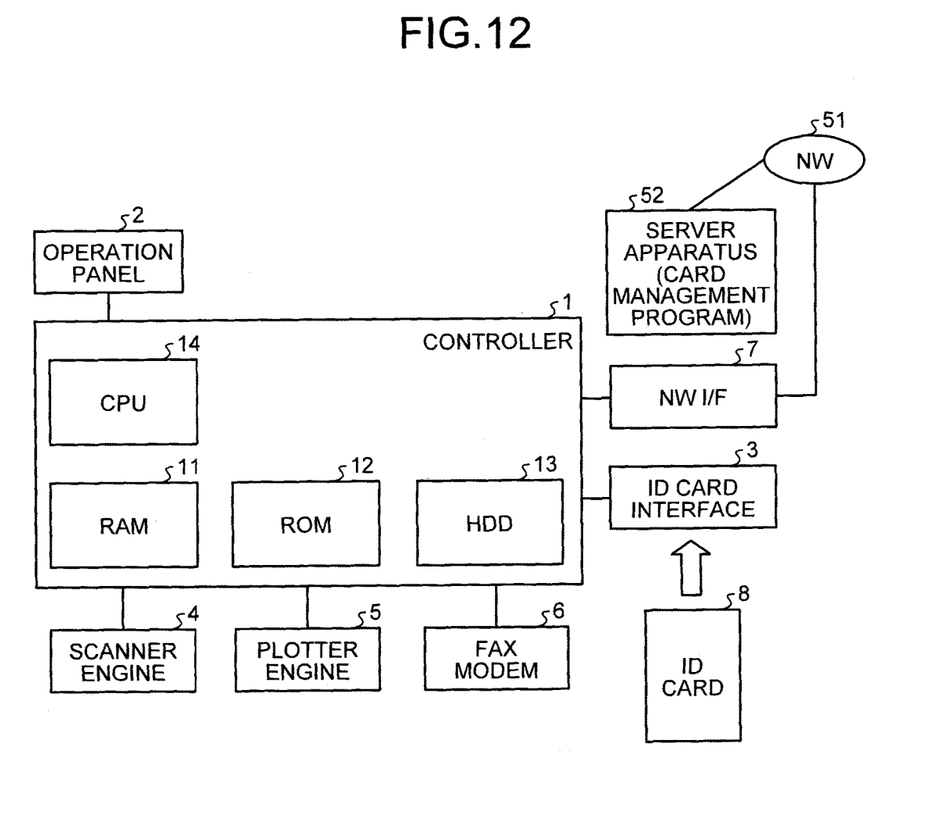
FIG. 12 is a hardware configuration diagram of an information processing system according to a second embodiment.

FIG. 12 illustrates a hardware configuration diagram of the information processing system of the second embodiment. In this information processing system, a server apparatus 52 is connected to the NWI/F 7 of the device through a network (NW) 51. In the server apparatus 52, the card management program is stored, and there is provided the ID card linkage unit 21 to the ID card control units 25 described using FIG. 2, a part or the whole of which is implemented with software or hardware.

Figure 13:
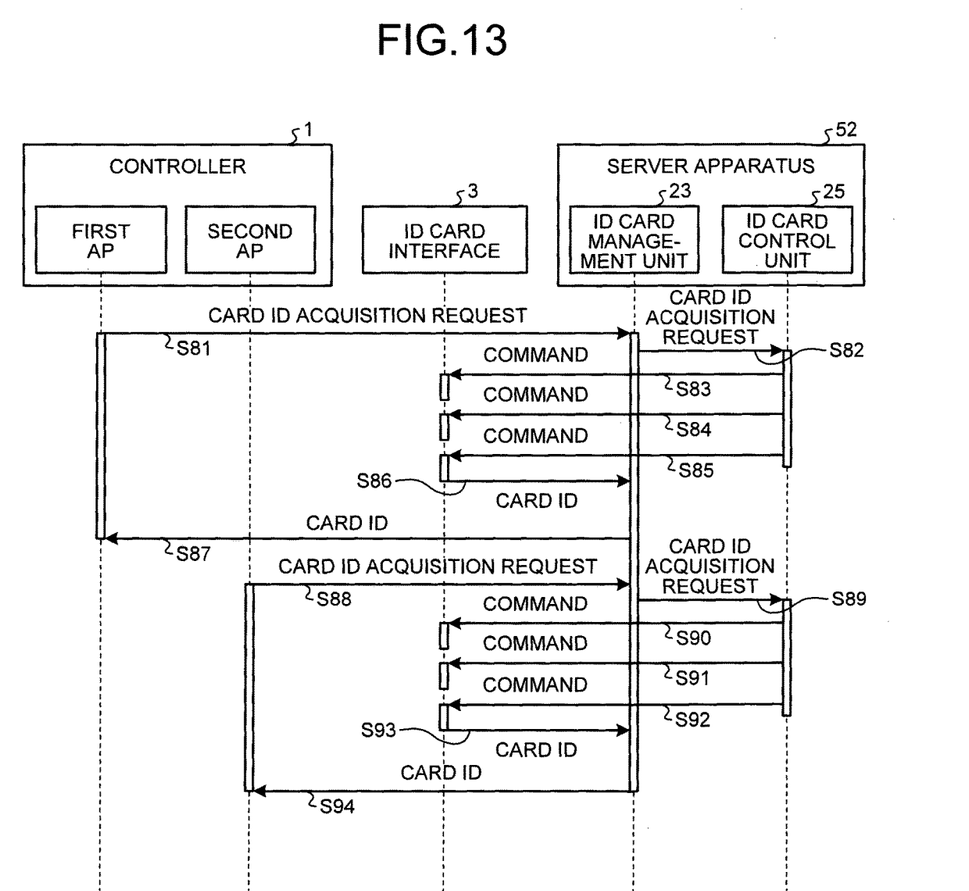
FIG. 13 is a time chart illustrating operation in which the ID card control unit and the like in a server apparatus mediate the use of information of the ID card attached on a device in the information processing system according to the second embodiment.

FIG. 13 is a time chart illustrating operation in which the ID card control unit 25 and the like in the server apparatus 52 mediate the use of information of the ID card 8 attached on the device in the information processing system according to the second embodiment.

First, in the case of this example, once the ID card 8 is attached on the ID card interface 3, the CPU 14 transmits information indicating the type of the attached ID card 8 to the server apparatus 52 through the NWI/F 7. Note that the CPU 14 and the NWI/F 7 are examples of a communication unit.

The server apparatus 52 refers to the ID card linkage table 22 using the received information indicating the type of the ID card 8, and responds to the device with information indicating an AP corresponding to the type of the ID card 8 attached on the device. The CPU 14 of the device notifies each AP indicated by the information with which the server apparatus 52 has responded of the fact that the information of the ID card 8 has become available. Thus, each AP becomes able to make a request for acquiring information stored in the ID card 8.

That is, when the first AP makes a card ID acquisition request at Step S81 in FIG. 13, the CPU 14 transmits the card ID acquisition request to the server apparatus 52 through the NWI/F 7. The ID card management unit 23 provided in the server apparatus 52 transmits the card ID acquisition request to the ID card control unit 25 corresponding to the type of the ID card 8, at Step S82. The ID card control unit 25 transmits commands corresponding to the card ID acquisition request to the ID card interface 3 through the network 51 at Step S83 to Step S85.

Thus, the ID card interface 3 transmits a card ID read out from the ID card 8 to the ID card management unit 23 of the server apparatus 52 through the network 51, as illustrated at Step S86. The ID card management unit 23 transmits the received card ID to the device through the network 51, at Step S87. In this manner, the first AP in the device can acquire and use the card ID.

Next, when the second AP makes a card ID acquisition request, the CPU 14 transmits the card ID acquisition request to the server apparatus 52 through the NWI/F 7, at Step S88. The ID card management unit 23 provided in the server apparatus 52 transmits the card ID acquisition request to the ID card control unit 25 corresponding to the type of the ID card 8, at Step S89. The ID card control unit 25 transmits commands corresponding to the card ID acquisition request to the ID card interface 3 through the network 51 at Step S90 to Step S92.

Thus, the ID card interface 3 transmits a card ID read out from the ID card 8 to the ID card management unit 23 of the server apparatus 52 through the network 51, as illustrated at Step S93. The ID card management unit 23 transmits the received card ID to the device through the network 51, at Step S94. In this manner, the second AP in the device can acquire and use the card ID.

As is clear from the above description, there are provided, in the server apparatus 52, the ID card management unit 23 and the ID card control units 25, for example, which support various types of ID cards 8 and have a function of enabling the use of information stored in the ID cards 8. In this manner, it is not necessary to provide the ID card linkage unit 21 to the ID card control units 25 in the device, which simplifies the configuration of the device. In addition, the same effects as in the above-mentioned first embodiment can be obtained.

Note that in the second embodiment, the ID card linkage unit 21 to the ID card control units 25 are provided in the server apparatus 52. However, some of the ID card linkage unit 21 to the ID card control units 25 may be provided in the server apparatus 52. Also in such a case, the same effects as the above can be obtained.

Each of the embodiments has been described in the above. However, each of the embodiments is presented as an example, and does not intend to limit the scope of the invention. Each of these novel embodiments can be implemented in other various forms, and various kinds of omission, replacement, and modifications are also possible without departing from the gist of the invention. For example, the above embodiments have described the case in which the device is an image forming apparatus such as a multifunction peripheral (MFP). Examples of the image forming apparatus include a LP (laser printer) device, a facsimile device, a scanner device, and other devices, in addition to the MFP. The example of the device may be other than the image forming apparatus, such as a projector device, a television conference system, and a digital camera device. The embodiments and the modification of the embodiments are included in the scope and the gist of the invention, and also included in the scope of the invention described in claims and the equivalent thereof.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST 1 controller
2 operation panel
3 ID card interface
4 scanner engine
5 plotter engine
6 modem device for facsimile (FAX modem)
7 NWI/F
8 ID card
11 RAM
12 ROM
13 HDD
14 CPU
21 ID card linkage unit
22 ID card linkage table
23 ID card management unit
24 ID card management table
25 ID card control unit
51 network
52 server apparatus

CITATION LIST

Patent Literature

Patent Literature 1: Japanese Patent Application Laid-open No. 2008-097652

The invention claimed is:

1. A device, comprising:
a storage medium control unit, implemented by circuitry, provided for each type of storage medium to at least read out information stored in the storage medium;
a first acquisition unit, implemented by the circuitry, that acquires first correspondence information in which each application program is associated with a type of a storage medium from which the application program uses information;
a second acquisition unit, implemented by the circuitry, that acquires second correspondence information in which a storage medium control unit is associated with a type of a storage medium from which the storage medium control unit can read out information;
a linkage unit, implemented by the circuitry, that determines an application program corresponding to a type of a storage medium from which information is to be read out, through the first acquisition unit, and determines a storage medium control unit corresponding to the type of the storage medium from which information is to be read out, through the second acquisition unit; and
a management unit, implemented by the circuitry, that enables the determined application program to use the determined storage medium control unit, and that grants a use right of the storage medium to an application program having received a notification indicating that information of the storage medium has become available, in order of request for grant of the use right of the storage medium.

2. The device according to claim 1, wherein
the linkage unit transmits the notification indicating that the information of the storage medium has become available, to the determined application program, and
the management unit acquires, when an information acquisition request has been transmitted from the application program having received the notification, information requested to be acquired, from the storage medium through the determined storage medium control unit, and enables the application program having made the acquisition request to use the acquired information.

3. The device according to claim 2, wherein
the application program having received the notification requests the management unit to grant the use right of the storage medium and makes the information acquisition request while adding the use right, and
the management unit acquires information from the storage medium through the determined storage medium control unit in response to only the acquisition request to which the use right is added.

4. A system, comprising:
a server apparatus including one or more units, implemented by circuitry, among
a storage medium control unit provided for each type of storage medium to at least read out information stored in the storage medium, a first acquisition unit that acquires first correspondence information in which each application program is associated with a type of storage medium from which the application program uses information, a second acquisition unit that acquires second correspondence information in which a storage medium control unit is associated with a type of a storage medium from which the storage medium control unit can read out information, a linkage unit that determines the application program corresponding to a type of a storage medium from which information is to be read out, through the first acquisition unit, and determines the storage medium control unit corresponding to the type of the storage medium from which information is to be read out, through the second acquisition unit, and a management unit that enables the determined application program to use the determined storage medium control unit, and that grants a use right of the storage medium to an application program having received a notification indicating that information of the storage medium has become available, in order of request for grant of the use right of the storage medium; and a device including a memory that stores therein a plurality of application programs that read out information stored in the storage medium, a communication unit, implemented by device circuitry, that performs at least a request for acquiring the information and communication of the information acquired from the storage medium, with the server apparatus through a certain network, and units, not provided in the server apparatus, among the storage medium control unit, the first acquisition unit, the second acquisition unit, the linkage unit, and the management unit, and the device being connected to the server apparatus through the network.

5. The system according to claim 4, wherein the linkage unit transmits the notification indicating that the information of the storage medium has become available, to the determined application program, and the management unit acquires, when an information acquisition request has been transmitted from the application program having received the notification, information requested to be acquired, from the storage medium through the determined storage medium control unit, and enables the application program having made the acquisition request to use the acquired information.

6. The system according to claim 5, wherein the application program having received the notification requests the management unit to grant the use right of the storage medium and makes the information acquisition request while adding the use right, and the management unit acquires information from the storage medium through the determined storage medium control unit in response to only the acquisition request to which the use right is added.

7. A processing method, comprising:

linking, by a linkage unit implemented by circuitry, including determining an application program corresponding to a type of a storage medium from which information is to be read out through a first acquisition unit, implemented by the circuitry, that acquires first correspondence information in which each application program is associated with a type of a storage medium from which the application program uses information, and determining a storage medium control unit, implemented by the circuitry, that corresponds to a type of a storage medium from which information is to be read out and is provided for each type of storage medium to at least read out information stored in the storage medium, through a second acquisition unit, implemented by the circuitry, that acquires second correspondence information in which a storage medium control unit is associated with a type of a storage medium from which the storage medium control unit can read out information; and managing, by a managing unit implemented by the circuitry, including enabling the determined application program to use the determined storage medium control unit, and granting a use right of the storage medium to an application program having received a notification indicating that information of the storage medium has become available, in order of request for grant of the use right of the storage medium.

* * * * *